United States Patent [19]

Schönfeld et al.

[11] Patent Number: 5,472,227
[45] Date of Patent: Dec. 5, 1995

[54] DEVICE TO CONTROL THE TRAILING AXLE OF A VEHICLE

[75] Inventors: Karl-Heinrich Schönfeld, Seelze; Hartmut Geiger, Garbsen, both of Germany

[73] Assignee: Wabco Vermogensverwaltungs-GmbH, Hanover, Germany

[21] Appl. No.: 248,648

[22] Filed: May 24, 1994

[30] Foreign Application Priority Data

May 28, 1993 [DE] Germany .............. 43 17 847.2

[51] Int. Cl.⁶ ............................ B60G 17/00; B62D 61/12
[52] U.S. Cl. ....................... 280/714; 280/683; 280/DIG. 1
[58] Field of Search ................................. 280/683, 714, 280/840, DIG. 1

[56] References Cited

U.S. PATENT DOCUMENTS

| | | | |
|---|---|---|---|
| 3,970,327 | 7/1976 | Dezelan | 280/683 |
| 5,090,726 | 2/1992 | Nakamura | 280/714 |
| 5,135,065 | 8/1992 | Kawasaki et al. | 280/714 |
| 5,273,308 | 12/1993 | Griffiths | 280/714 |

FOREIGN PATENT DOCUMENTS 3416422 11/1985 Germany .
3428867 2/1986 Germany .

*Primary Examiner*—Kenneth R. Rice
*Attorney, Agent, or Firm*—Meltzer, Lippe, Goldstein

[57] ABSTRACT

The inventive device controls the trailing axle of a vehicle having at least two rear axles, wherein at least one rear axle is a driving axle. Pressure fluid chambers, mounted on both the driving and trailing axles, support the vehicle structure. Their pressure is varied to raise or lower the vehicle structure depending on the vehicle load and road conditions. The inventive device further comprises a first valve arrangement and a second valve arrangement. The first valve arrangement selectively connects the pressure fluid chambers of the driving axle to a compressed-air supply, to a pressure fluid sink, or isolates them. The first valve arrangement has a first and a second valve. The first valve is a 3/2-position valve actuated by a first solenoid. The second valve of the first valve arrangement is a 2/2-position valve actuated by a second solenoid. The second valve arrangement is a 3-position valve actuated by a third solenoid. The 3-position valve is controlled by cooperation of the third solenoid and a control pressure. This selectively connects the pressure fluid chambers of the trailing axle to the pressure fluid chamber of the driving axle, or to the pressure fluid sink. Alternatively, the 3-position valve isolates the trailing axle pressure fluid chambers. The control pressure is taken from the pressure fluid output of the first valve.

6 Claims, 2 Drawing Sheets

DEVICE TO CONTROL THE TRAILING AXLE OF A VEHICLE

BACKGROUND OF THE INVENTION

The present invention relates to a device to control the trailing axle of a vehicle. More particularly, the present invention relates to a device to control the height of a rear end portion of a vehicle having at least two rear axles, where one rear axle serves as a driving axle and another rear axle serves as a trailing axle. Such a device is known from DE-OS 34 16 422.

This known device for controlling the height of a vehicle with a trailing and a driving axle typically has air suspension bellows and valves. A first valve arrangement can selectively connect the air suspension bellows of the driving axle to a pressure fluid source or sink. Alternatively, the first valve arrangement can isolate the air suspension bellows of the driving axle.

Similarly, a second valve arrangement can selectively connect the air suspension bellows of the trailing axle to the air suspension bellows of the driving axle or to the pressure fluid sink. Alternatively, the second valve arrangement can isolate the trailing axle bellows thus interrupting its connection with the driving axle bellows. The operation and function of this known device are discussed below.

In normal operation, the second valve arrangement connects the air suspension bellows of the driving axle to the air suspension bellows of the trailing axle. This allows the same pressure to prevail in the air suspension bellows of both the driving and the trailing axles.

As used herein, an input receives a connection from a previous circuit, an output provides a connection to the next circuit, and an outlet connects the particular circuit to a pressure fluid sink vented to the atmosphere.

The first valve arrangement, which consists of a first valve and a second valve, is then switched over. This interrupts the connection between the pressure fluid supply container and the second valve. (The output of the first valve is disconnected from its input). The switched first valve arrangement also connects the pressure fluid line, going from the first valve to the second valve, to the atmosphere via the first valve. (The output of the first valve is connected to its outlet). Furthermore, the second valve disconnects the pressure fluid line, going from the second valve to the air suspension bellows, from the vented pressure fluid line. (The output of the second valve is disconnected from its input).

The vehicle structure is raised by increasing the air volume in the air suspension bellows. The valves of the first and second valve arrangements are actuated electrically to connect the air suspension bellows to the pressure supply container. When a desired vehicle height (distance between the vehicle axles and the vehicle structure) is reached, the valves are switched over to isolate the air suspension bellows from the pressure supply container and the pressure fluid sink (i.e., the atmosphere).

Conversely, the vehicle structure is lowered by decreasing the air volume in the air suspension bellows. The valves of the first and second valve arrangements are actuated electrically to connect the air suspension bellows to the pressure fluid sink. When a desired vehicle height is reached, the second valve of the first valve arrangement is switched over to isolate the air suspension bellows.

To put a heavy load on the driving axle of the vehicle under unfavorable road conditions, such as slippery or loose road surfaces, the pressure in the air suspension bellows of the trailing axle is decreased. This is accomplished by switching over the second valve arrangement consisting of two valves. The switching disconnects the air suspension bellows of the trailing axle from the air suspension bellows of the driving axle. Furthermore, the switching connects the air suspension bellows of the trailing axle to the pressure fluid sink.

If it is desired to maintain the pressure in the air suspension bellows of the trailing axle and at the same time disconnect it from the air suspension bellows of the driving axle, then both valves of the second valve arrangement are actuated.

To be able to carry out the above-described functions, it is necessary to provide each of the four valves with a solenoid for the actuation of the valves. Furthermore, it is necessary to provide several electric lines which require a plurality of pins on a plug to connect the electric lines to a control device.

It is the object of the instant invention to decrease the number of required solenoid activated valves of the above mentioned device while maintaining all the mentioned functions of the known device.

In particular, this invention offers the advantage that it is possible to change the air volume in the pressure fluid chambers of the driving and trailing axles of a vehicle at minimal cost. Furthermore, the air volume in the pressure fluid chambers of the trailing axle is maintained independently of the air volume in the pressure fluid chambers of the driving axle.

SUMMARY OF THE INVENTION

The present invention is a device to control the trailing axle of a vehicle having at least two rear axles, wherein at least one rear axle is a driving axle. Pressure fluid chambers, mounted on both the driving and trailing axles, support the vehicle structure. Their pressure is varied to raise or lower the vehicle structure depending on the vehicle load and road conditions.

In a particular illustrative embodiment, an air suspension system of a multi-axle vehicle comprises a first valve arrangement and a second valve arrangement. The first valve arrangement selectively connects the pressure fluid chambers of the driving axle to a compressed-air supply, to a pressure fluid sink, or isolates them.

The first valve arrangement has a first and a second valve. The first valve is a 3/2-position valve actuated by a first solenoid, and has a pressure fluid input connected to a compressed-air supply, a pressure fluid output, and an outlet connected to a pressure fluid sink (i.e., atmospheric pressure).

The second valve of the first valve arrangement is a 2/2-position valve actuated by a second solenoid, and has a pressure fluid input and output. Its pressure fluid input is connected to the pressure fluid output of the first valve. Moreover, the pressure fluid output of the second valve is connected to the pressure fluid chambers supported on the driving axle.

Furthermore, the pressure fluid output of the second valve is connected to the pressure fluid input of the second valve arrangement. The second valve arrangement is a 3-position valve actuated by a third solenoid. The 3-position valve is controlled by cooperation of the third solenoid and a control pressure. This selectively connects the pressure fluid chambers of the trailing axle to the pressure fluid chamber of the driving axle, or to the pressure fluid sink. Alternatively, the 3-position valve disconnects the trailing axle pressure fluid chambers from the driving axle pressure fluid chambers and from the pressure fluid sink. The control pressure is taken from said pressure fluid output of the first valve.

In another illustrative embodiment, the first valve of the first valve arrangement, which comprises the 3/2-position valve actuated by the first solenoid, is pre-controlled by a pressure fluid from a control chamber. In addition, the control connection of the second valve is not connected to the pressure fluid output of the first valve. Instead, the control connection is connected to the control chamber of the first valve via a pressure fluid line.

BRIEF DESCRIPTION OF THE DRAWINGS

This invention is explained below in greater detail through the drawings, wherein.

DETAILED DESCRIPTION OF PREFERRED EMBODIMENTS OF THE INVENTION

Figure 1:
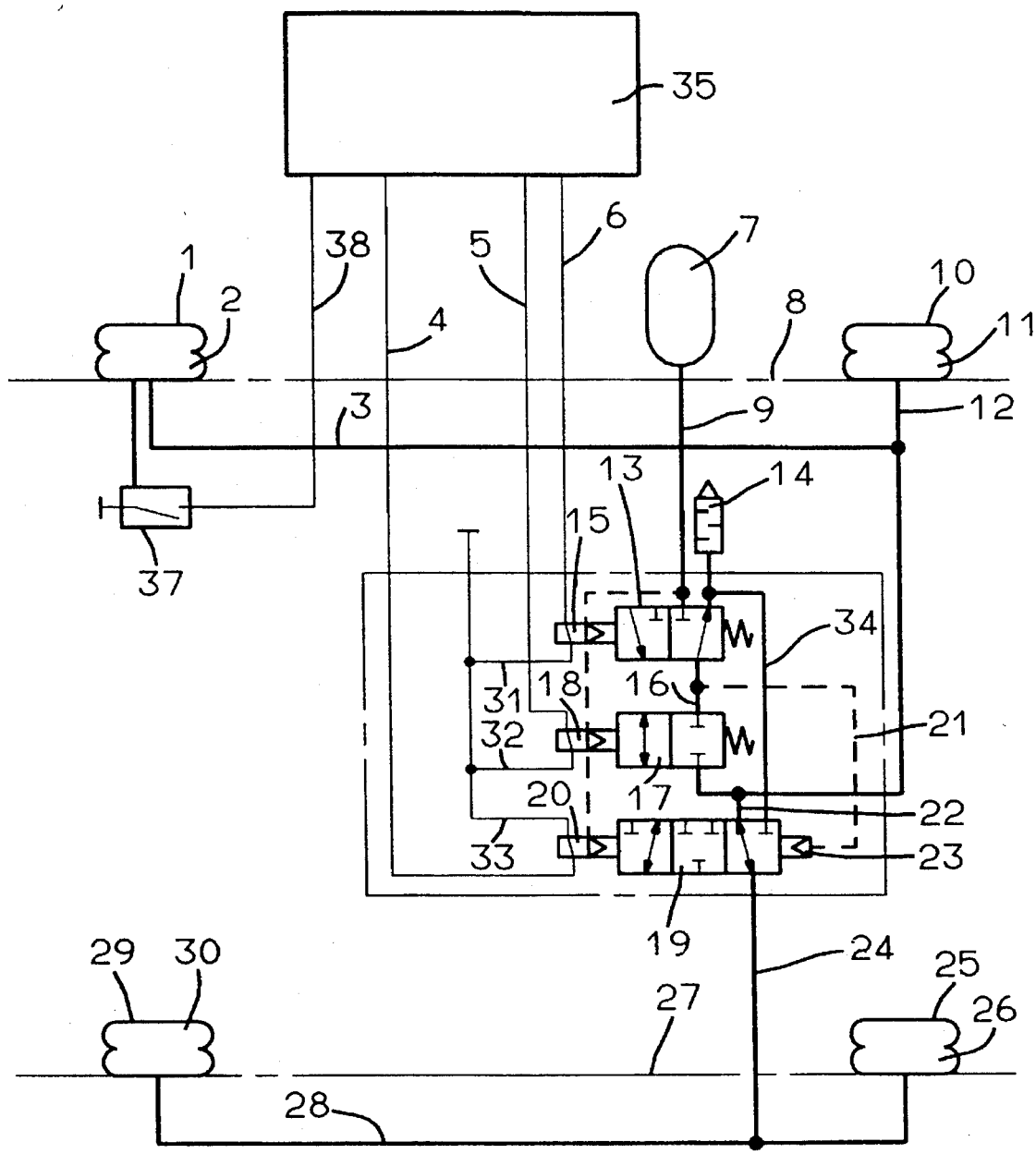
FIG. 1 shows a first embodiment of a device to control the rear axle of a vehicle, according to the invention, where the output pressure of a first valve of a first valve arrangement, controlling the air volume of the pressure fluid chambers of the driving axle, serves to control a second valve arrangement influencing the air volume of the pressure fluid chambers of the trailing axle of the vehicle.

FIG. 1 schematically shows part of an air suspension system of a multi-axle vehicle.

A left air suspension bellows (1) and a right air suspension bellows (10) are supported on a driving axle (8) of a vehicle. Furthermore, an additional left air suspension bellows (29) and an additional right air suspension bellows (25) are supported on a trailing axle (27) of the vehicle structure. The left air suspension bellows (1) and the right air suspension bellows (10) of the driving axle (8) are provided respectively with pressure fluid chambers (2) and (11). Similarly, the left air suspension bellows (29) and the right air suspension bellows (25) of the trailing axle are provided respectively with pressure fluid chambers (30) and (26).

A compressed-air supply container (7), serving as a pressure fluid source, is connected via a pressure fluid line (9) to the pressure fluid input of a solenoid-actuated 3/2-position first valve (13). The first valve (13) has a pressure fluid input, a pressure fluid output, a pressure fluid outlet, and a solenoid (15) to switch over the first valve (13). The pressure fluid outlet is connected via a pressure fluid line to a pressure fluid sink (14) leading to the atmosphere. The output of the first valve (13) is connected via a pressure fluid line (16) to the input of a second valve (17).

The second valve (17) is a 2/2-position valve actuated by a solenoid (18) which switches over the second valve (17). It has an input and an output. The output of the second valve (17) is connected, via a pressure fluid line (3), to the pressure fluid chamber (2) of the left air suspension bellows (1) of the driving axle (8). A pressure fluid line (12), branching off from the pressure fluid line (3), is connected to the pressure fluid chamber (11) of the right air suspension bellows (10) of the driving axle (8).

The first valve (13) and the second valve (17) constitute a first valve arrangement (13, 17) via which the pressure fluid chambers (2, 11) associated with the driving axle (8) are selectively connected to the compressed-air supply container (7), to the pressure fluid sink, or disconnected from both.

A pressure fluid line (22) branches off from the pressure line (3) which connects the output of the second valve (17) to the pressure fluid chambers (2 and 11) of the air suspension bellows (1 and 10) associated with the driving axle (8). The branched off pressure fluid line (22) goes to the input of a second valve arrangement (19).

The second valve arrangement (19) has an input, an output and an outlet. It also has a 3-position valve which is actuated either by a solenoid (20) or by a pneumatic actuation (i.e., impulse actuation). This pneumatic actuation is accomplished by a control piston (not shown) capable of being subjected to control pressure fluids via a control connection (23) for its switching function.

The control connection (23) of the second valve arrangement (19) is connected via a pressure fluid line (21) to the pressure fluid line (16). The outlet of the second valve arrangement (19) is connected, via a pressure fluid line (34), to the outlet of the first valve (13) which is connected to the pressure fluid sink (14) leading to the atmosphere.

The output of the second valve arrangement (19) is connected, via a pressure fluid line (24), to a pressure fluid line (28). This connects the pressure fluid chambers (26) and (30) of the air suspension bellows (25) and (29) of the trailing axle (27) to each other.

The solenoid (15) of the first valve (13) of the first valve arrangement (13, 17) is connected, via an electric line (6), to an electric control device (35) of the air suspension system of the vehicle. Similarly, the solenoid (18) of the second valve (17) of the first valve arrangement (13, 17) is connected, via an electric line (5), to the electric control device (35). An electric line (4) connects the electric control device (35) to the solenoid (20) of the second valve arrangement (19). The solenoids (15, 18, 20) are grounded via electric lines (31, 32, 33).

The operation of the system described above is explained in further detail below.

In normal operation, the solenoids (15, 18, 20) of the first valve (13) and of the second valve (17) of the first valve arrangement (13, 17) as well as the valve of the second valve arrangement (19) are not excited. In this default state, the first valve (13) and the second valve (17) of the first valve arrangement (13, 17) disconnect the pressure fluid chambers (2, 11, 26, 30) of the air suspension bellows (1, 10, 25, 29) from the compressed-air supply container (7) and from the atmosphere. This occurs because the pressure fluid output of the second valve (17) is disconnected from its input, which is connected to the pressure fluid output of the first valve (13). Furthermore, the pressure fluid output of the first valve (13) is disconnected from its input, which is connected to the compressed-air supply container (7) as shown in FIG. 1. Instead, the output of the first valve (13) is connected to its outlet, which is connected to the pressure fluid sink (14) leading to the atmosphere.

Moreover, in the normal operating position, the output of the second valve arrangement (19) is connected to its input and is disconnected from its outlet leading to the pressure fluid sink (14). The second valve arrangement, in the default state, connects the pressure fluid chambers (2, 11) of the air suspension bellows (1, 10) of the driving axle (8), to the pressure fluid chambers (26, 30) of the air suspension bellows (25, 29) of the trailing axle (27) via pressure fluid line (3, 12, 22, 24, 28). Therefore, the same pressure exists in the pressure fluid chambers (2, 11) of the air suspension bellows (1, 10) of the driving axle (8) and in the pressure fluid chambers (26, 10) of the air suspension bellows (25, 29) of the trailing axle (27).

The vehicle structure can be raised by increasing the air volume in the pressure chambers (2, 11) of the air suspension bellows (1, 10) of the driving axle (8) and in the pressure fluid chambers (26, 30) of the air suspension bellows (25, 29) of the trailing axle (27). To increase the air volume in these pressure chambers, switching signals are transmitted by the electrical control device (35) via the electric lines (6, 5) to the solenoid (15) of the first valve (13) and to the solenoid (18) of the second valve (17) of the first valve arrangement (13, 17). The actuated solenoids (15) and (18) switch over the valves (13) and (17). The solenoid (20) of the second valve arrangement (19) is not actuated.

The switched first valve (13) connects its input to the pressure fluid input of the second valve (17). The input of the first valve (13) is connected to the compressed-air supply container (7) via the pressure fluid line (9).

The switched second valve (17) connects the pressure fluid line (16) at its input to its output. The output of the second valve is on the one hand connected to the pressure fluid lines (3, 12) going to the pressure fluid chambers (2, 11) of the air suspension bellows (1, 10) of the driving axle, (8) and on the other hand connected, via the second valve arrangement (19), to the pressure fluid lines (24, 28) going to the pressure fluid chambers (26, 30) of the air suspension bellows (25, 29) of the trailing axle (27). The compressed air goes from the compressed-air supply container (7) into the pressure fluid chambers (2, 11) of the air suspension bellows (1, 10) of the driving axle (8) and into the pressure fluid chambers (26, 30) of the air suspension bellows (25, 29) of the trailing axle (27). This raises the vehicle structure.

The compressed air from the compressed-air supply container (7) serves as control pressure for the second valve arrangement (19). The compressed air goes to the control piston (not shown in the figures) of the second valve arrangement (19). It does so via the pressure fluid line (21), which branches off from the pressure fluid line (16), and goes to the control connection (23) of the second valve arrangement (19). The control pressure exerted on the control piston of the second valve arrangement (19) does not switch over the second valve arrangement (19). It is switched over only after solenoid (20) is actuated electrically.

When the volume in the pressure fluid chambers (2, 11, 26, 30) of the air suspension bellows (1, 10, 25, 29) has reached a predetermined level, the electrical control device (35) removes the switching signals going to the solenoids (16, 18) of the first valve (13) and of the second valve (17). The first valve (13) and the second valve (17) of the first valve arrangement (13, 17) return to their default position. The output of the first valve (13) is now disconnected from its input, and connected to its outlet, which is connected to the pressure fluid sink (14) leading to the atmosphere. This disconnects the compressed-air supply container (7) from the pressure fluid line (16). Furthermore, the pressure fluid line (21) going to the control connection (23) of the second valve arrangement (19) is now connected, via the outlet of the first valve (13), to the atmosphere.

Moreover, the second valve (17) of the first valve arrangement (13, 17) is now in the open position, where its pressure fluid input and output are disconnected from each other. This disconnects the pressure fluid line (16) from the pressure fluid lines (3, 12, 22, 24, 28) going to the pressure fluid chambers (2, 11, 26, 30) of the air suspension bellows (1, 10, 25, 29).

By contrast, the vehicle structure can be lowered by decreasing the air volume in the pressure fluid chambers (2, 11, 26, 30) of the air suspension bellows (1, 10, 25, 29). The electrical control device (35) transmits a switching signal, via electric line (5), to the solenoid (18) of the second valve (17) of the first valve arrangement (13, 17). The energized solenoid (18) switches over the second valve (17) thus connecting its pressure fluid input to its output. This connects, through the first valve (13), the pressure fluid chambers (2,1) of the air suspension bellows (1, 10) of the driving axle (8), to the pressure fluid sink (14) leading to the atmosphere. This connection is accomplished via the pressure fluid lines (3, 12, 22), the second valve (17), the pressure fluid line (16) and the outlet of the first valve (13).

Similarly, the pressure fluid chambers (26, 30) of the air suspension bellows (25, 29) of the trailing axle (27) are connected to the pressure fluid sink (14) leading to the atmosphere. This connection is via the pressure fluid lines (28, 24) being connected through the second valve arrangement (19) to the pressure fluid line (22). The pressure fluid line (22) is connected through the second and first valves (17, 13) of the first valve arrangement to the pressure fluid sink (14) leading to the atmosphere. Furthermore, the pressure fluid line (22) is connected to the pressure fluid line (3). This equalizes the pressure in all the fluid chambers (2, 11, 26, 30) of the air suspension bellows (1, 10, 25, 29) of the driving and trailing axles (8, 27).

Once the air volume in the pressure fluid chambers (2, 11, 16, 30) of the air suspension bellows (1, 10, 25, 29) has reached the predetermined level, the electrical control device (35) removes the switching signal going to the solenoid (18) of the second valve (17) of the first valve arrangement (13, 17). The second valve (17) returns to its default position. Thus, the pressure fluid input of the second valve is disconnected from its output. This disconnects the pressure fluid line (16) going from the second valve (17) to the first valve (13), from the pressure fluid lines (3, 12, 22, 24, 28) going from the second valve (17) to the pressure fluid chambers (2, 11, 26, 30) of the air suspension bellows (1, 10, 25, 29). Therefore, the vehicle structure is maintained at the desired level.

If the driving axle (8) is to be loaded more heavily, the electrical control device (35) transmits a switching signal via the electric line (4) to the solenoid (20) of the second valve arrangement (19). No control pressure is applied at the control connection (23) of the second valve arrangement (19). The first valve (13) and the second valve (17) of the first valve arrangement (13, 17) are not actuated. The actuated solenoid (20) switches over the second valve arrangement (19) so as to disconnect the pressure fluid output of the second valve arrangement (19) from its input, and connects its output to its pressure fluid outlet. This disconnects the pressure fluid lines (3, 12), going from the first valve arrangement (13, 17) to the pressure fluid chambers (2, 11) of the air suspension bellows (1, 10) of the driving axle (8), from the pressure fluid lines (24, 28), going from the second valve arrangement (19) to the pressure fluid chambers (26, 30) of the air suspension bellows (25, 29) of the trailing axle (27).

Furthermore, the switched second valve arrangement connects the pressure fluid chambers (26, 30) of the air suspension bellows (25, 29) of the trailing axle (27) to the pressure fluid sink (14) leading to the atmosphere. This connection is via the pressure fluid lines (28, 24), the second valve arrangement (19) and the pressure fluid line (34). The pressure fluid line (34) connects the pressure fluid outlet of the second valve arrangement (19) to the pressure fluid outlet of the first valve (13) of the first valve arrangement (13, 17). Thus, the pressure is vented from the pressure fluid chambers (26, 30) of the air suspension bellows (25, 29) of the trailing axle (27) into the atmosphere via the pressure fluid sink (14).

Since the air volume in the pressure fluid chambers (30, 26) of the air suspension bellows (29, 25) of the trailing axle (27) decreases, the air suspension bellows (1, 10) of the driving axle (8) are subjected to greater load by the vehicle structure. Therefore, they are compressed to a degree which depends on the load of the vehicle structure. The distance between the driving axle (8) and the vehicle structure decreases. The pressure in the air suspension bellows (1, 10) of the driving axle (8) increases.

In order to re-establish the original distance between the driving axle (8) and the vehicle structure, the air volume in the air suspension bellows (1, 10) of the driving axle must be increased.

To accomplish this, the electric control device (35) actuates the solenoids (15, 18) of the first valve (13) and of the second valve (17) of the first valve arrangement (13, 17). The switching signal at the solenoid (20) of the second valve arrangement (19) continues to keep the solenoid (20) in a state of excitation. That is, all three solenoids (15, 18, 20) are actuated.

The first valve (13) and the second valve (17) then switch over. This disconnects the output of the first valve (13) from the pressure fluid sink (14) and connects the output of the first valve (13) to the compressed-air supply (7). (The output of the first valve (13) is disconnected from the outlet of the first valve (13) and this output is connected to the input of the first valve (13)). Furthermore, the switched second valve connects the pressure fluid chambers (2, 11) of the air suspension bellows (1, 10) of the driving axle (8) to the compressed-air supply container (7). This connection is via the pressure fluid lines (3, 12), the second valve (17), the pressure fluid line (16), the first valve (13) and the pressure fluid line (9). This causes compressed air to flow from the compressed-air supply container (7) into the pressure fluid chambers (2, 11) of the air suspension bellows (1, 10) of the driving axle (8).

At the same time, the control connection (23) of the second valve arrangement (19) is pressurized by a control pressure fluid. The control pressure fluid comes from the compressed air which goes from the compressed-air supply container (7) to the control connection (23). This is accomplished via the pressure fluid line (21) branching off from the pressure fluid line (16) which is connected between the output of the first valve (13) and the input of the second valve (17) of the first valve arrangement (13,17).

Since the control connection (23) is pressurized, the actuated solenoid (20) of the second valve arrangement (19), switches over the second valve arrangement (19) into the middle position. In this middle position, the pressure fluid output of the second valve arrangement (19), which is connected to the air suspension bellows (29, 25) of the trailing axle (27), is disconnected from its pressure fluid outlet. The output of the second valve arrangement (19) is also disconnected from its pressure fluid input, which is connected to the air suspension bellows (1, 10) of the driving axle (8).

The process of venting the pressure from the pressure fluid chambers (2, 11) of the air suspension bellows (1, 10) of the driving axle (8) is thus necessarily interrupted during the time in which pressure fluid is introduced into the pressure fluid chambers (2, 11) of the air suspension bellows (1, 10) of the driving axle (8).

Because the air volume in the air suspension bellows (1, 10) of the driving axle (8) is increased by the introduction of compressed air, the distance between the vehicle axle and the driving axle (8), as well as the trailing axle (27), also increases. The air suspension bellows (29, 25) of the trailing axle (27) are pulled out along their longitudinal axes. The pressure in the air suspension bellows (29, 25) of the trailing axle (27) necessarily decreases in this process. Meanwhile, the pressure in the air suspension bellows (1, 10) of the driving axle (8) increases further because of the greater load on the driving axle (8).

Next, the electric control device (35) removes the actuating signals from the solenoids (15, 18). Thus the two valves (13, 17) switch over to their default state. The compressed-air supply container (7) is then disconnected from the pressure fluid line (16) and from the air suspension bellows (1, 10) of the driving axle (8). In other words, the pressure fluid output of the first valve (13) is disconnected from its input, and connected to its outlet, which is connected to the pressure fluid sink (14) leading to the atmosphere.

The control connection (23) of the second valve arrangement (19) is also vented to the atmosphere through the pressure fluid sink (14). This connection is via the pressure fluid lines (21, 16, 9) through the first valve (13). Meanwhile, the pressure fluid input and output of the second valve (17) remain disconnected from each other.

Because the control connection (23) is vented to the atmosphere, while the solenoid (20) remains actuated, the second valve arrangement (19) no longer remains in the middle position. It switches over again in such manner that the air suspension bellows (29, 23) of the trailing axle (27) are connected to the atmosphere via the pressure fluid line (34), the pressure fluid outlet of the first valve (13), and the pressure fluid sink (14). The switched second valve arrangement (19) also disconnects the air suspension bellows (29, 25) of the trailing axle (27) from the air suspension bellows (1, 10) of the driving axle (8). In other words, in this switched position, the pressure fluid output of the second valve arrangement (19) is disconnected from its input or its middle position, and connected to its pressure fluid outlet.

The electric control device (35) is preferably made in such a manner that it repeatedly performs the following steps. Initially, after the starting phase of the "starting assistance" process, the air volume in the air suspension bellows (29, 25) of the trailing axle (27) is decreased, without changing the air volume in the air suspension bellows (1, 10) of the driving axle (8). Next, the air volume in the air suspension bellows (1, 10) of the driving axle (8) is reduced, while keeping constant the air volume in the air suspension bellows (29, 25) of the trailing axle (27).

These steps are repeated until the original distance between vehicle structure and driving axle (8) is re-established and the desired axle load distribution has been achieved. Illustratively, a pressure sensor (37) which is connected via an electric line (38) to the electric control (35), senses the load on the driving axle (8).

To maintain the reduced air volume in the air suspension bellows (29, 25) of the trailing axle (27), e.g., during an extended starting process of the vehicle on slick surface, the solenoid (20) of the second valve arrangement (19) remains actuated. Furthermore, the control connection (23) is pressurized. The actuated solenoid (20), while the control connection (23) is pressurized, switches over the second valve arrangement (19) to the middle position. This isolates the air suspension bellows (29, 25) of the trailing axle (27) and maintains their air volume constant.

The control connection (23) is pressurized as follows. A switching signal is transmitted by the electric control device (35) to the solenoid (15) of the first valve (13) of the first valve arrangement (13, 17). The solenoid (18) of the second valve (17) is not actuated. The first valve (13) switches over disconnecting its pressure fluid output from its outlet, and connecting the output to its input. This disconnects the control connection (23) of the second valve arrangement (19) from the pressure fluid sink (14). Instead, it connects the control connection (23) of the second valve arrangement (19) to the compressed-air supply container (7).

Compressed air goes to the control connection (23) of the second valve arrangement (19) from the compressed-air supply container (7) via the first valve (13), the pressure fluid line (16) and the pressure fluid line (21) serving as control line. The second valve arrangement (19) is thereby placed into its middle switching position. This isolates the air suspension bellows (29, 25) of the trailing axle (27) disconnecting it from both the air suspension bellows (1, 10) of the driving axle (8), as well as from the pressure fluid outlet 914) leading to the atmosphere. In other words, the pressure fluid output of the second valve arrangement (19), connected to the pressure fluid line (24), is disconnected from both its input, connected to the pressure fluid line (22), and from its outlet, connected to the pressure fluid line (34). Thus, the air volume in the pressure fluid chambers (30, 26) of the air suspension bellows (29, 25) of the trailing axle (27) is maintained constant.

Next, the switching signal at the solenoid (20) of the second valve arrangement (19) is removed. The second valve arrangement (19) switches over to its default position. In the default state, the second valve arrangement (19) connects the air suspension bellows (29, 25) of the trailing axle to the air suspension bellows (1, 10) of the driving axle (8). This equalizes the pressure in the air suspension bellows (1,10) of the driving axle (8) and in the air suspension bellows (29, 25) of the trailing axle (270.

Subsequently, the switching signal at the solenoid (15) of the first valve (13) is also removed. The first valve (13) switches over to its default state. This vents its output by connecting it to its outlet leading to the atmosphere. This also vents the control connection (23) of the second valve arrangement (19) via the pressure fluid lines (21) and (16), and the first valve (13).

Sensors, not shown in the figures, connected to the electrical control device (35), are illustratively installed on the vehicle to monitor the distance between the vehicle structure and at least one vehicle axle. The electrical control device (35) senses changes in this distance occurring during the starting assistance process. Accordingly, it transmits switching signals to the first valve arrangement (13, 17) that correct the air volume in the air suspension bellows (1, 10, 29, 25), until the desired distance between vehicle structure and vehicle axles (8, 27) is reestablished.

Illustratively, it is also possible to design the electric control device (35) so that when the switch which starts the starting assistance process is actuated, switching signals are transmitted simultaneously to all three solenoids (15, 18, 20). The three actuated solenoids simultaneously switch over the two valves of the first valve arrangement (13, 17) and the valve of the second valve arrangement (19).

This increases the air volume in the air suspension bellows (1, 10) of the driving axle (8). Additionally, this switches the second valve arrangement (19) to its middle position, which isolates the air volume in the air suspension bellows (25, 29) of the trailing axle (27). Therefore, the air volume in the air suspension bellows (25, 29) of the trailing axle (27) remains constant.

Figure 2:
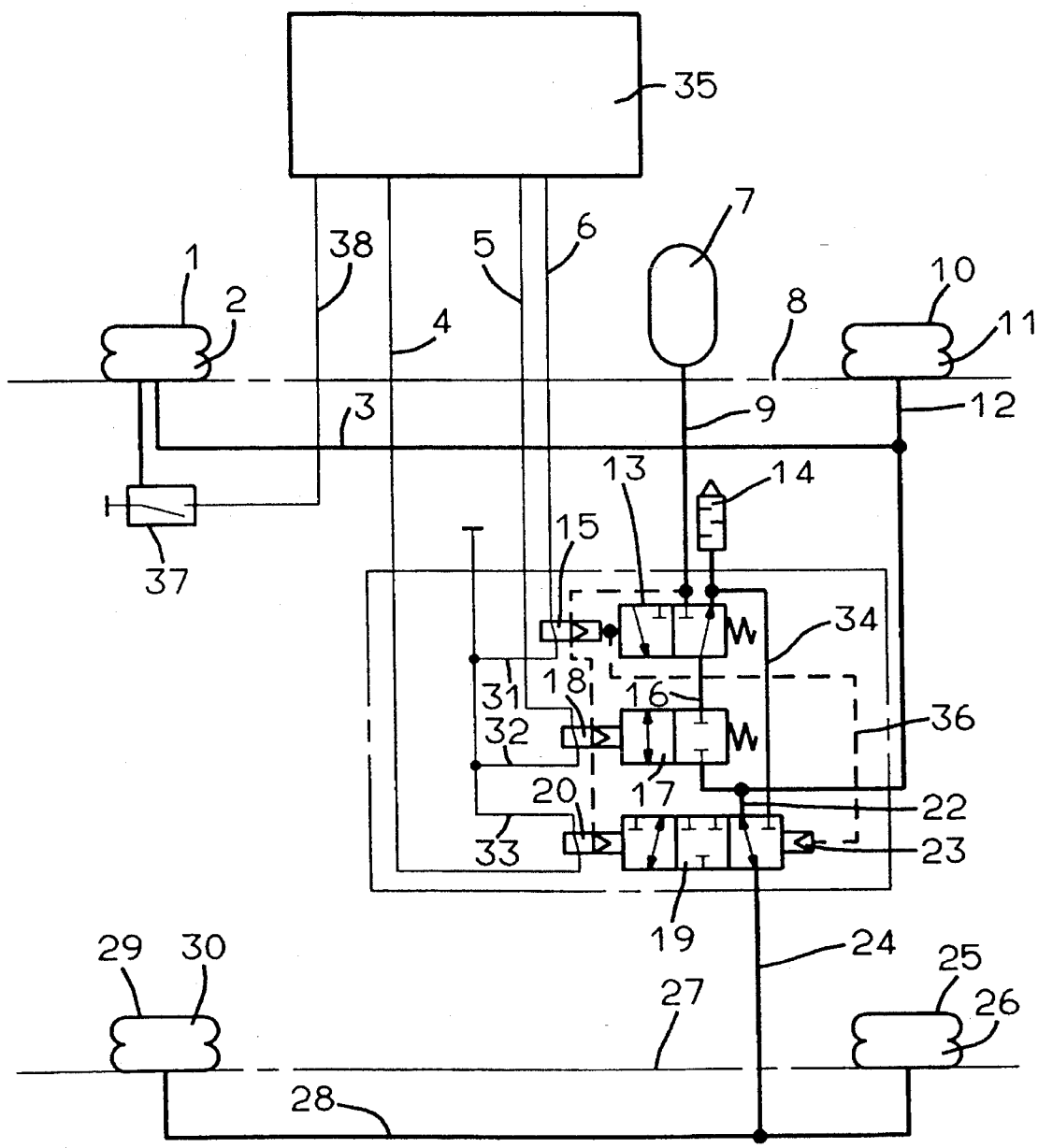
FIG. 2 shows a second embodiment of the inventive device comparable to the device shown in FIG. 1, wherein the air volume of the pressure fluid chambers of the trailing axle is controlled by a control pressure of the first valve arrangement.

FIG. 2 shows an arrangement comparable to the arrangement of FIG. 1. For the sake of clarity, the components which are identical with the components shown in FIG. 1 are given the same reference numbers. Only the essential differences between the arrangement according to FIG. 1 and the arrangement according to FIG. 2 is discussed here.

According to FIG. 2, the first valve (13) of the first valve arrangement (13, 17) is made in the form of a pre-controlled 3/2-position valve actuated by solenoid (15). A pressure fluid line (36), serving as a control line, goes from a control chamber (not shown) of the first valve (13) to the control connection (23) of the second valve arrangement (19). A switching signal, transmitted by the electric control device (35) to the solenoid (15) of the first valve (13) of the first valve arrangement (13, 17), actuates the solenoid. Thus, the first valve (13) switches over connecting its output to its input. This connects the compressed-air supply container (7) to the pressure fluid line (16) going from the first valve (13) to the second valve (17) of the first valve arrangement (13, 17). At the same time, pressure fluids go from the control chamber (not shown) of the first valve (13), via pressure fluid line (36), to the control connection (23) of the second valve arrangement (19). The second valve arrangement (19) in this embodiment is not controlled by the output pressure of the first valve (13) of the first valve arrangement (13, 17), but by the control pressure of the first valve (13).

For example, the electric control device (35) according to FIGS. 1 and 2 may be a component of a device for automatic level regulation of a vehicle. Such an automatic level adjustment device is not further discussed because it is not an absolute requirement for the present inventive device.

Illustratively, the first valve (13) and the second valve (17) can be combined into one single multi-position valve arrangement. Naturally, it is also possible to combine the first valve (13), the second valve (17), and the second valve arrangement (19) into one structural unit.

In the description, it was often stated, for the sake of simplicity, that the pressure fluid is introduced into the air suspension bellows. This means that pressure fluid is introduced into the inner space, i.e., into the pressure fluid chamber of the (one or several) air suspension bellows. Similarly, the description states that the air volume in the air suspension bellows is increased or decreased. This means that the amount of compressed air in the pressure fluid chamber of the (one or several) air suspension bellows is increased or decreased.

However, it is not necessary that the pressure fluid chamber be part of an air suspension system. It may be part of a mechanical suspension device supporting the vehicle structure. Such a mechanical suspension device could connect the vehicle axle or axles to the vehicle structure either directly or via the pressure fluid chamber. Furthermore, the pressure fluid used may also be liquid pressure fluid instead of air.

For example, the starting assistance process can be initiated and ended by either actuating a switch in the driver's cabin of the vehicle, or automatically in response to signals from a drive-slip-regulating device.

Illustratively, the starting assistance process may also be terminated automatically either at the end of a predetermined period, or when a predetermined travel speed is exceeded.

Finally, the invention has been described above with reference to illustrative embodiments. Those having ordinary skill in the art may devise numerous other embodiments without departing from the spirit and scope of the following claims.

We claim:

1. A device to control the trailing axle of a vehicle having at least two rear axles, wherein at least one rear axle is a driving axle and at least one rear axle is a trailing axle, comprising a plurality of pressure fluid chambers which support a vehicle structure mounted on both said driving axle and said trailing axle, a first valve arrangement having a first valve and a second valve which selectively connect at least one driving axle pressure fluid chamber to a pressure fluid supply or to a pressure fluid sink, or which disconnect said pressure fluid chamber from the pressure fluid supply and from the pressure fluid sink, said first valve of said first valve arrangement comprising a 3/2-position valve actuated by a first solenoid, a pressure fluid input connected to the pressure fluid supply, a pressure fluid output, and an outlet connected to the pressure fluid sink, said second valve of said first valve arrangement comprising a 2/2-position valve actuated by a second solenoid, a pressure fluid input connected to the pressure fluid output of the first valve, and a pressure fluid output connected to the driving axle pressure fluid chamber, and a second valve arrangement comprising a pressure fluid input connected to the pressure fluid output of the second valve of the first valve arrangement, and a 3-position valve actuated by a third solenoid controlled by cooperation of said third solenoid and a control pressure to selectively connect at least one trailing axle pressure fluid chamber to the driving axle pressure fluid chamber or to the pressure fluid sink, or to disconnect said trailing axle pressure fluid chamber from the driving axle pressure fluid chamber and from the pressure fluid sink, said control pressure being taken from said pressure fluid output of said first valve.

2. The device of claim 1 wherein said pressure fluid output of said first valve of the first valve arrangement is connected via a pressure fluid line to a control connection of the second valve arrangement.

3. The device of claim 2 further comprising an electrical control device, and wherein said second valve arrangement further comprises a pressure fluid output, a pressure fluid outlet, and wherein said pressure fluid input of said second valve arrangement is connected to said at least one driving axle pressure fluid chamber, said pressure fluid output of said second valve arrangement is connected to said at least one trailing axle pressure fluid chamber, said pressure fluid outlet of said second valve arrangement is connected directly to the pressure fluid sink or is connected to the outlet of the first valve of the first valve arrangement, said control connection of said second valve arrangement is connected to the pressure fluid output of the first valve, and said third solenoid of said second valve arrangement is electrically connected to the electrical control device.

4. A device to control the trailing axle of a vehicle having at least two rear axles, wherein at least one rear axle is a driving axle and at least one rear axle is a trailing axle, comprising a plurality of pressure fluid chambers which support a vehicle structure mounted on both said driving axle and said trailing axle, a first valve arrangement having a first valve and a second valve which selectively connect at least one driving axle pressure fluid chamber to a pressure fluid supply or to a pressure fluid sink, or which disconnect said pressure fluid chamber from the pressure fluid supply and from the pressure fluid sink, said first valve of said first valve arrangement is pre-controlled by a pressure fluid and comprise a 3/2-position valve actuated by a first solenoid, a pressure fluid input connected to the pressure fluid supply, a pressure fluid output, and an outlet connected to the pressure fluid sink, said second valve of said first valve arrangement comprising a 2/2-position valve actuated by a second solenoid, a pressure fluid input connected to the pressure fluid output of the first valve, and a pressure fluid output connected to the driving axle pressure fluid chamber, and a second valve arrangement comprising a pressure fluid input connected to the pressure fluid output of the second valve of the first valve arrangement, and a 3-position valve actuated by a third solenoid controlled by cooperation of said third solenoid and a control pressure to selectively connect at least one trailing axle pressure fluid chamber to the driving axle pressure fluid chamber or to the pressure fluid sink, or to disconnect said trailing axle pressure fluid chamber from the driving axle pressure fluid chamber and from the pressure fluid sink, said control pressure being taken from said pressure fluid which pre-controls said first valve.

5. The device of claim 4 wherein said first valve of the first valve arrangement is pre-controlled by a pressure fluid taken from a control chamber connected via a pressure fluid line to a control connection of the second valve arrangement.

6. The device of claim 5 further comprising an electrical control device, and wherein said second valve arrangement further comprises a pressure fluid output, a pressure fluid outlet, and wherein said pressure fluid input of said second valve arrangement is connected to said at least one driving axle pressure fluid chamber, said pressure fluid output of said second valve arrangement is connected to said at least one trailing axle pressure fluid chamber, said pressure fluid outlet of said second valve arrangement is connected directly to the pressure fluid sink or is connected to the outlet of the first valve of the first valve arrangement,
said control connection of said second valve arrangement is connected to the control chamber of the first valve, and said third solenoid of said second valve arrangement is electrically connected to the electrical control device.

* * * * *